United States Patent Office 3,738,995
Patented June 12, 1973

3,738,995
SOLVENT PROCESS FOR THE PREPARATION OF 1 - CARBAMOYL-SUBSTITUTED 2 - BENZIMIDAZOLECARBAMATES
Charles D. Adams, Newark, Del., and Rudolph Schlatter, Chadds Ford, Pa., assignors to E. I. du Pont de Nemours and Company, Wilmington, Del.
No Drawing. Continuation-in-part of abandoned application Ser. No. 774,528, Nov. 8, 1968. This application May 14, 1971, Ser. No. 143,628
Int. Cl. C07d 49/38
U.S. Cl. 260—309.2    4 Claims

ABSTRACT OF THE DISCLOSURE

1 - carbamoyl-substituted 2 - benzimidazolecarbamate fungicides are made by reacting an alkyl 2-benzimidazolecarbamate with the appropriate isocyanate in a selected solvent such as methyl ethyl ketone at temperatures between 10 and 100° C. for 0.1 to 24 hours.

The process is particularly useful for the preparation of 1-butylcarbamoyl-2-benzimidazolecarbamic acid, methyl ester, a compound useful as a fungicide.

CROSS-REFERENCE TO RELATED APPLICATIONS

This application is a continuation-in-part of our co-pending application Ser. No. 774,528, filed Nov. 8, 1968, now abandoned.

BACKGROUND OF THE INVENTION

1 - carbamoyl-substituted 2-benzimidazolecarbamates are highly effective fungicides. Their use as fungicides has been described in detail in French Pat. 1,523,597 granted Mar. 25, 1968 and U.S. Pat. 3,541,213. These patents teach that the compound 1-(n-butylcarbamoyl)-2-benzimidazolecarbamic acid, methyl ester can be formulated with various adjuvants, e.g., surfactants and diluents, and applied at various rates to control the fungus diseases of plants and other organic and industrial materials. For example, the compound can be applied at rates of 0.012 to 60 kilograms of active per hectare to control a broad spectrum of fungi on the foliage, stems and fruit of living plants.

Both the U.S. and French patents teach making these fungicides by the reaction of an alkyl 2-benzimidazolecarbamate with an isocyanate in chloroform, carbon tetrachloride, methylene, chloride, benzene, cyclohexane and mixtures of these solvents. This process has drawbacks in that the reaction time is prolonged and in many instances another solvent is necessary to recover the product from the reaction slurry.

SUMMARY OF THE INVENTION

We have discovered that these fungicides can be made in high yields, in high purity, and with shorter reaction times if an alkyl 2-benzimidazolecarbamate is reacted with the isocyanate using methyl ethyl ketone as the solvent. Acetone or dimethylformamide can also be used to advantage; however, methyl ethyl ketone is the preferred solvent.

This process has additional advantages in that it can be operated at high concentrations of reactants and product in the solvent. This advantage, combined with short reaction times, reduces the volume requirements of the reaction vessel for production of a given weight of product per unit of time. Further, near-stoichiometric relative quantities of reactants can be used, and the deleterious effect when there is an appreciable quantity of water in the reaction mixture is minimized. A further advantage is that the product is easily isolated and the remaining solvent containing dissolved product and unreacted isocyanate can be reused with resultant yield benefit and without significant decrease in product purity.

DESCRIPTION OF THE INVENTION

This invention relates to an improved method for the preparation of the 1-carbamoyl-substituted 2-benzimidazolecarbamate fungicides disclosed in French Pat. 1,523,-597 and U.S. Pat. 3,541,213. Preferably, it relates to the preparation of 1-carbamoyl-substituted 2-benzimidazole-carbamate fungicides of the formula:

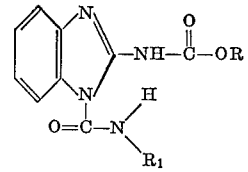

where R is methyl, ethyl or isopropyl and $R_1$ is n-alkyl of 1 through 8 carbon atoms. The method of the invention is particularly suited for the preparation of 1-butylcarbamoyl - 2-benzimidazolecarbamic acid, methyl ester, which compound is an outstanding fungicide.

In the method of the invention an alkyl 2-benzimidazolecarbamate of the formula:

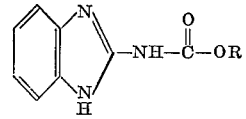

is reacted with an isocyanate of the formula: $R_1NCO$, where R and $R_1$ are as defined above.

A slurry or solution of the 2-benzimidazolecarbamic acid, alkyl ester and isocyanate is made in methyl ethyl ketone and the slurry or solution is agitated until the reaction is essentially complete. The product, a 1-carbamoyl-substituted 2-benzimidazolecarbamate, can be recovered by conventional techniques, e.g., centrifugation or filtration, washed with solvent and dried by conventional methods.

With the use of methyl ethyl ketone as the solvent, it is practical to use a high weight ratio of the alkyl 2-benzimidazolecarbamate to the solvent, such as from 1:2 to 1:10, preferably from 1:3 to 1:4. This high weight ratio of reactant to solvent allows a reduction in the required size of the reaction vessel for the production of a given amount of product.

Methyl ethyl ketone is the preferred solvent since it is lower in cost, and is easily removed from the product. Further, it permits the practical use of greater reactant to solvent ratios.

Methyl ethyl ketone also has advantages when a wet alkyl 2-benzimidazolecarbamate is used as a reactant, or when water is used as a co-solvent; i.e., the methyl ethyl ketone need not be anhydrous. Advantage is thus taken of methyl ethyl ketone's not being completely water-miscible. After the reaction is completed, and the product removed, the filtrate (or the centrifugate) can contain appreciable water; the methyl ethyl ketone and water layers can then be separated mechanically and the methyl ethyl ketone layer re-used. Addition of an inorganic salt, e.g., sodium chloride, permits the separation of a greater amount of water from the methyl ethyl ketone layer. This procedure conserves organic solvents and prevents the build-up of high water concentration in the used solvent, thereby keeping the volume of used solvent low. The used methyl ethyl ketone retains most of any unreacted isocyanate and on further use as reaction medium, affords product in yield and purity nearly as high as those obtained with fresh methyl ethyl ketone.

Use of water, alone, as a solvent for this reaction is generally recognized to be impractical. Water reacts readily with isocyanates to form undesired by-products according to the following equations:

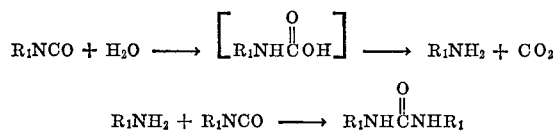

Yield of product from isocyanate is seriously reduced by these side reactions.

Surprisingly, we have found that when methyl ethyl ketone is used, the deleterious effect of water in the system is substantially reduced. The reaction rate of the alkyl isocyanate with the alkyl-2-benzimidazolecarbamate is maximized and the side reaction of alkyl isocyanate with water is minimized.

The reaction of the alkyl 2-benzimidazolecarbamate with the isocyanate to form product is reversible and the equilibrium constant for the reaction is temperature dependent. Higher temperatures favor the reverse reaction and rapid attainment of a state of equilibrium. A temperature range of 10 to 100° C. may be employed, although a range of 20 to 45° C. is preferred and a range of from 25 to 35° C. is most preferred. Within the last preferred range, there occurs not only a fast rate of reaction, but the equilibrium of the reaction highly favors the formation of product.

The alkyl 2-benzimidazolecarbamate and the isocyanate can be used in the range of mole ratios from 1:1 to 1:1.1, preferably from 1:1 to 1:1.05, and most preferably 1:1.05 in the interests of obtaining a high percentage of conversion of the alkyl 2-benzimidazolecarbamate to the product without the use of unneeded excess isocyanate or long reaction time. The reaction time required for essentially complete reaction is from 0.1 to 24 hours, preferably from 1.0 to 3.0 hours and most preferably from 2 to 2½ hours. In addition to the amount of solvent and reactants, temperature and type of mixing used, the required reaction time is also dependent on the particle size of the alkyl 2-benzimidazolecarbamate. In the interests of obtaining a higher reaction rate, smaller particle size is desired. Preferably the diameter of the particle should be from 1 to 250 microns, and most preferably from 1 to 50 microns. A useful method for determining particle size of the alkyl 2-benzimidazolecarbamate is by sedimentation analysis with an Andreasen pipette.

The time required for the isocyanate addition is not critical and may vary from 0.10 to 10 hours, preferably from 0.1 to 2 hours and most preferably from 0.25 to 0.5 hour.

The order of addition of reactants and solvent is not critical. It is usually convenient to use the order of solvent, alkyl benzimidazolecarbamate and then isocyanate.

The following examples are offered to illustrate the process of the invention. All parts are parts by weight unless otherwise indicated.

EXAMPLE 1

Preparation of 1-(n-butylcarbamoyl)-2-benzimidazolecarbamic acid, methyl ester in virgin methyl ethyl ketone A mixture of 95.6 parts of 2-benzimidazolecarbamic acid, methyl ester, 53 parts of n-butyl isocyanate and 338 parts of methyl ethyl ketone is stirred for 2 hours in a resin kettle. The temperature of the reaction slurry is maintained at 25°–35° C. during the first hour and at 25° C. for the second hour. The reaction slurry is then filtered and the solids are rinsed with 74.7 parts of methyl ethyl ketone and air-dried. A total of 130.3 parts of 1-(n-butylcarbamoyl)-2-benzimidazolecarbamic acid, methyl ester is obtained. Product purity is 99% or better.

EXAMPLE 2

Preparation of 1-(n-butylcarbamoyl)-2-benzimidazolecarbamic acid, methyl ester in recycled methyl ethyl ketone A mixture of 95.6 parts of 2-benzimidazolecarbamic acid, methyl ester, 50.3 parts of n-butyl isocyanate, 94.5 parts of methyl ethyl ketone and 246.5 parts of recycled filtrate (96.5% methyl ethyl ketone; 2.2% 1-(n-butylcarbamoyl)-2-benzimidazolecarbamic acid, methyl ester; 0.8% n-butyl isocyanate; 0.5% unknowns) are stirred for 2 hours at 25°–35° C. The reaction slurry is then filtered and the solids are rinsed with 69 parts of methyl ethyl ketone and air-dried. A total of 138.7 parts of 1-(n-butylcarbamoyl)-2-benzimidazolecarbamic acid, methyl ester is obtained. Product purity is 99% or better.

EXAMPLE 3

Preparation of 1-(n-butylcarbamoyl)-2-benzimidazolecarbamic acid, methyl ester in methyl ethyl ketone containing traces of water A mixture of 57.4 parts of 2-benzimidazolecarbamic acid, methyl ester, 31.2 parts of n-butyl isocyanate, 198 parts of methyl ethyl ketone and 2 parts of water is stirred in a round-bottomed flask for 2 hours at 25°–35° C. The mixture is then filtered and the solids rinsed with 45 parts of methyl ethyl ketone and air-dried. A total of 79 parts of 1-(n-butylcarbamoyl)-2-benzimidazolecarbamic acid, methyl ester is obtained. Product purity is 99.5% by non-aqueous titration.

EXAMPLE 4

Preparation of 1-(n-butylcarbamoyl)-2-benzimidazolecarbamic acid, methyl ester in methyl ethyl ketone-water mixtures A mixture of 57.4 parts of 2-benzimidazolecarbamic acid, methyl ester, 31.2 parts of n-butyl isocyanate, 100 parts of methyl ethyl ketone and 100 parts of water is stirred in a round-bottomed flask for 2 hours at 25°–35° C. The mixture is then filtered and the solids are washed with 40 parts of methyl ethyl ketone and dried in vacuo. A total of 82.8 parts of 1-(n-butylcarbamoyl)-2-benzimidazolecarbamic acid, methyl ester is obtained. Unreacted 2-benzimidazolecarbamic acid, methyl ester was less than 1%.

EXAMPLE 5

Preparation of 1-(n-butylcarbamoyl)-2-benzimidazolecarbamic acid, methyl ester in methyl ethyl ketone containing water A mixture of 57.4 parts 2-benzimidazolecarbamic acid, methyl ester, 31.2 parts n-butyl isocyanate, 190 parts methyl ethyl ketone and 10 parts of water is stirred in a round-bottom flask for 2 hours at 25°–35° C. The mixture is then filtered and the solids rinsed with 45 parts of methyl ethyl ketone and air-dried. A total of 79.7 parts of 1-(n-butylcarbamoyl)-2-benzimidazolecarbamic acid, methyl ester is obtained. Product purity is 99.0% by non-aqueous titration.

We claim:

1. A method for preparing a 1-carbamoyl-substituted 2-benzimidazolecarbamate of the formula:

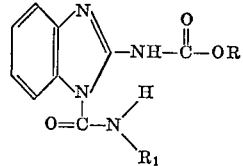

wherein R is methyl, ethyl or isopropyl and $R_1$ is n-alkyl of 1 through 8 carbon atoms, by reacting an alkyl 2-benzimidazolecarbamate of the formula:

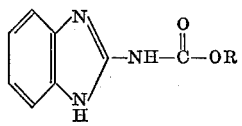

with an isocyanate of the formula:

wherein R and $R_1$ are defined as above, in methyl ethyl ketone.

2. The method of claim 1 wherein the reaction is conducted at a temperature between 10 and 100° C. for a period of 0.1 to 24 hours.

3. The method of claim 1 wherein the alkyl 2-benzimidazolecarbamate is in the form of particles having a diameter of from 1 to 250 microns.

4. A method for preparing 1-(n-butylcarbamoyl)-2-benzimidazolecarbamic acid, methyl ester by reacting 2-benzimidazolecarbamic acid, methyl ester with n-butyl isocyanate in methyl ethyl ketone at a temperature between 25 and 35° C. for a period of 1 to 3 hours.

References Cited

UNITED STATES PATENTS

| | | | |
|---|---|---|---|
| 3,119,865 | 1/1964 | Weakley et al. | 260—553 R |
| 3,248,398 | 4/1966 | Mühlbauer et al. | 260—309.2 |
| 3,112,342 | 11/1963 | Luckenbauch | 260—309.2 |

FOREIGN PATENTS

| | | | |
|---|---|---|---|
| 1,523,597 | 3/1968 | France | 260—309.2 |

OTHER REFERENCES

Parker in: Advances in Organic Chemistry, vol. 5, pp. 1–5 relied on, New York, Wiley, 1965, QD251–A3.

NATALIE TROUSOF, Primary Examiner